United States Patent Office 3,516,752
Patented June 23, 1970

3,516,752
MEASURING CELL WITH GAS AND PARTICLE COLLECTION
Jiří Hrdina, Prague, Czechoslovakia, assignor to Ceskoslovenska akademie ved, Prague, Czechoslovakia
Filed July 6, 1966, Ser. No. 563,113
Claims priority, application Czechoslovakia, July 6, 1965, 4,329/65
Int. Cl. G01n 1/10
U.S. Cl. 356—246    3 Claims

ABSTRACT OF THE DISCLOSURE

A flowcell for use in a photometric system includes an elongated inclined passageway for measuring light beams and for the fluid to be measured, said passageway being closed at each end by light permeable closure members. An entrance duct for the fluidal material to be measured leads into the passageway, an exit duct for measured fluidal material originates at the lowest portion of the inclined passageway, and a third outlet duct originating at the highest point of the passageway is attached to a source of a gaseous pressure medium. Control means govern in prearranged manner the said three ducts to separate their individual action. A groove may possibly extend along the highest generatrix of the passageway downward from the origin of the third outlet duct towards the opening of the entrance duct to conduct gaseous portions of the fluidal medium separated from its liquid portion.

---

The invention relates to a photometric analysis system for measuring light extinction, fluorescence and conductivity of liquids, and for similar purposes.

In my device liquids are continuously measured in a measuring flowcell arranged in inclined position, the cell being emptied in prearranged manner and the inner walls of the emptied cell being completely cleaned of any remanents of liquid sticking thereto from a preceding operation by blowing through the cell a pressure gas in prearranged working manner.

In accordance with my invention such inclined flowcell is provided at the lowest place of its internal measuring space with a discharge duct possibly closable by a valve, and with an inlet duct at one end that is at the lower or upper end of said internal space, the said lowest place in the internal space of the measuring cell being conveniently designed as a pocket or chamber adjoining the working space of the cell for collecting the heavier particles separated from the liquid. Conveniently arranged in the input duct is a valve closing this duct while the cell is being emptied. The flow through at least one of the ducts can be periodically changed. Into the highest place of the internal measuring space of the cell opens a tube which can be closed in prearranged manner and which is connected either with a source of a pressure gas, or with a source of a gas having a pressure lower than atmospheric, or with both such sources. The supply tube of the liquid and the supply tube for the pressure gas, or both these supply tubes are conveniently elastic, or comprise an elastic element. In the upper part of the internal space of the cell is possibly an axially extending groove into which opens the supply tube for the tested liquid. The output duct may be connected with a suction pump leading to a drain.

The device in accordance with the invention may also be arranged in such a manner that the tubing for supplying the liquid is connected with a programmed device working in prearranged manner which causes the excessive amount of the liquid to be drawn away.

Figure 1:
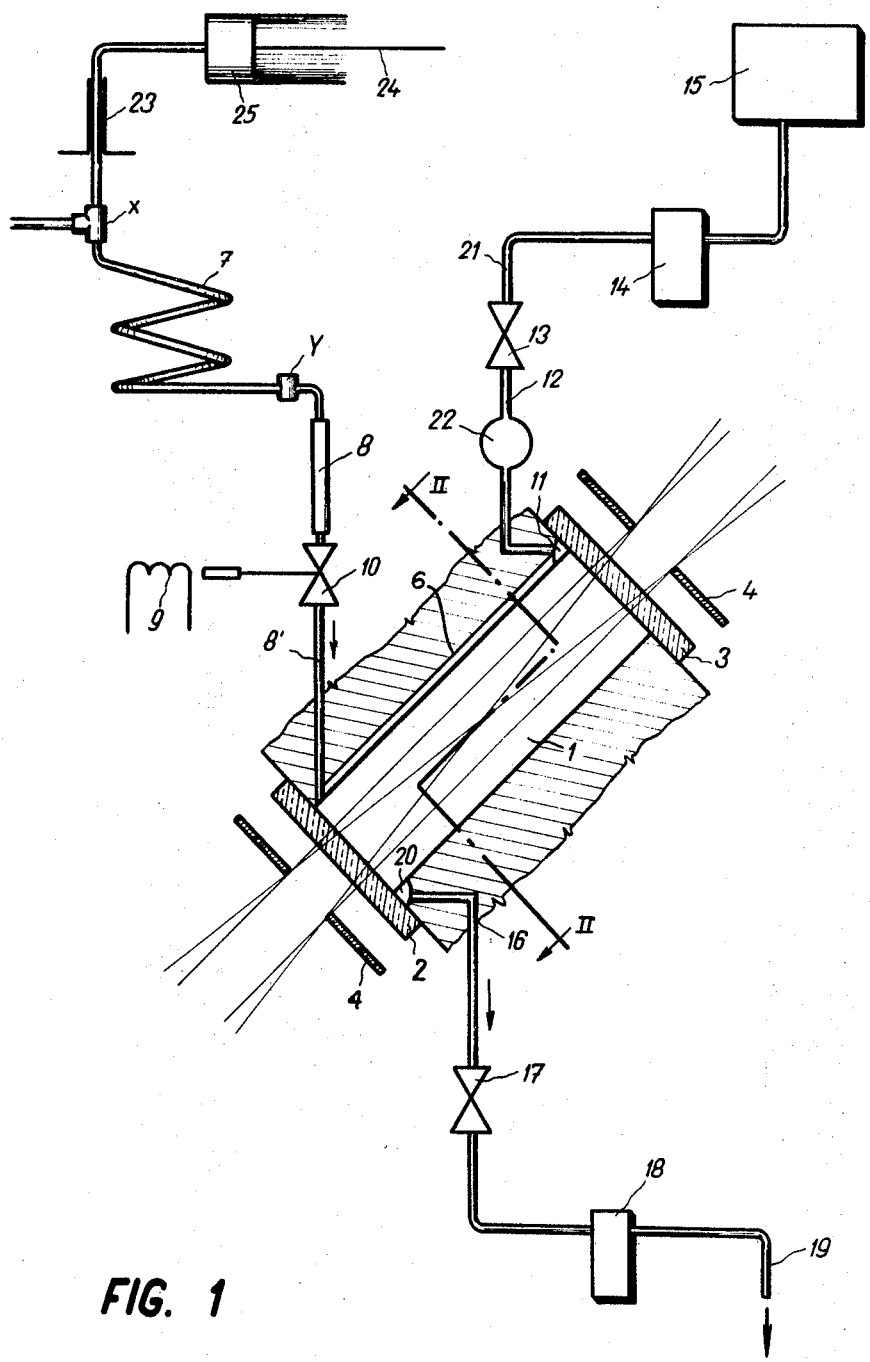
Figure 2:
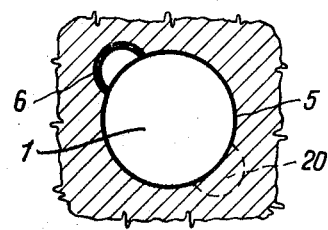

The invention with its various advantages will be best understood from the following specification to be read in conjunction with the accompanying drawings, in which:

FIG. 1 illustrates schematically an embodiment of the device in accordance with the invention;
FIG. 2 is a transverse section through the measuring cell along the line II—II in FIG. 1; and
FIG. 3 indicates another embodiment of a part of the device shown in FIG. 1.

Referring now more particularly to FIG. 1 the longitudinal measuring cell is formed by an oblique bore 1 closed by transparent plates 2, 3. Through these transparent plates passes from a not shown light source a measuring light beam limited by screens 4, 4' to a region near the axis of the cell.

As shown in more detail in FIG. 2, the transverse width of the bore 1 is limited by the circular wall 5 and enlarged by a smaller circular arc 6. The liquid to be tested in the measuring cell passes through a capillary reactor 7 followed by elastic capillary tubes 8, 8' separated by a valve 10 controlled by an electromagnet 9. The lower elastic capillary tube 8' enters a duct opening into the lower part of a groove formed by the arc 6 shown in FIG. 2. In its upper part this groove enters a chamber 11 into which opens a tube 12 connected over a valve 13 with a pump 14, or directly with a gas supply tank 15 of approximately constant pressure. From the lowest place 20 of the bore 1 of the measuring cell extends a drain conduit 16 leading over a valve 17 to the pump 18 which draws off or doses in the case of an over-pressure discharge a programmed amount of liquid in each novel cycle into the drain 19.

The device operates fundamentally in the following manner:

A liquid or a mixture of a liquid and of a gas, for example sections of said liquid and of gas bubbles separating these liquid sections, enter the bore 1 of the cell through the tube 8' and fill it with a new liquid dose, while the preceding filling of liquid or air leaves the cell through the tube 12. No material flows through the tubes 16, 19 because any communication is interrupted at this time either by valve 17 or by the idle pump 18. If at this time another liquid or some particle of a solid material enter together with the liquid to be tested, it retreats in view of its different specific weight from the zone reserved for the passage of the active beam of light rays. For example, air bubbles will move upward within the cell bore 1 in the longitudinally thereof extending groove limited transversely by the arc 6 without interfering with the passage of light. Similarly will for example an oil drop behave. On the other hand, a particle of heavier specific weight will drop into the lowest place 20 of the bore 1 of the cell. At the same time the liquid or gaseous part from a preceding cycle will recede from the bore 1 of the cell into the tube 12 while the valve 13 is open or the pump 14 is sucking; the said preceding liquid or gaseous part may also be directly driven into the wider tube 21 which may be elastic. It is also possible to arrange a non-illustrated duct from the wider tube 21 directly to the tank 15; the collecting space 22 need not be elastic.

In the following part of the cycle in which the optically active space 1 is reliably filled with new liquid, there follows the proper photometric measurement which lasts for a certain part of the work cycle.

Thereafter the space 1 of the measuring cell will be emptied through the tube 16. This can be effected in different manners.

The most effective way for perfect emptying of the cell is admission of overpressure gas from the tank 15 by opening the valve 13 or by sucking by the pump 14 in such a manner that the gas thus forced into the space 1 of the cell drives the liquid out therefrom and along with it also particles of liquid which stick to the walls with which the liquid has been in contact. The supply of the liquid can be closed by the valve 10. But the cell may also be emptied without actuating this valve while admitting fresh liquid through the channel 8'; in this case a certain loss of liquid arises which then can no longer be utilized for further measuring evaluation. Another effective method is sucking the liquid from the space 1 of the cell by action of the pump 18 which secures sucking off the respective amount of liquid and of gas following. In this case the valve 17 is not required. The above described two methods of emptying the cell space can also be carried out though less perfectly for example by gravitational force while the valve 17 is kept open.

If the supply of fresh liquid is stopped by closing the valve 10 then excessively high pressures should be avoided if fresh liquid flows into the ractor. If the walls of the reactor 7 are elastic they will damp pressure waves. If the walls are not elastic, for example if a glass capillary is used, it is necessary to use an elastic tube 8 which for a short time, when the tube 8' is closed by the valve 10, will collect the excess of the liquid arriving from the reactor 7. If a stream of liquid interrupted by gas bubble pistons passes through the reactor 7, the content of the reactor is sufficiently elastic by itself in view of the effect of the gas bubbles to compensate any undesirable rise of pressure caused by arrival of the liquid while the valve 10 is temporarily closed. The same applies if only gas passes through the reactor 7. Another way to prevent an undesirable increase in the pressure, even without using the valve 10, resides in the fact that for the duration of the undesirable arrival of liquid into the space 1 of the cell, the liquid accumulates in the space of the short capillary tube 23 which may form an extension of the reactor 7 for example at the place marked x or y, and in which the excessive amount of liquid is temporarily assembled by the suction effect of the piston 24 moving in the cylinder 25. A similar effect can be achieved by respective phasing of the supply of liquid into the reactor 7. This may be achieved for example by periodically pumping a ninhydrine agent by a nonillustrated pump in front of the reactor 7 at the place x so that during emptying space 1 of the cell the supply of a new dose of this agent is not only stopped but this agent may also be temporarily drawn back into the tube 23 through which the supply of the agent opens into the mixing place x in front of the reactor 7. In the next phase, not only the accumulated but a new dose of the agent is expelled by the pump discharge.

The size of the central openings of the screens 3 and 4 is primarily determined in view of foreign particles, more particularly bubbles. In a cell where a new dose of liquid is admitted into the measuring space previously filled for example with gas, homogenization of the content is secured because no continuous flowing is here involved causing parabolization of the wave fronts due to the Poiseuille law. The openings of the screens 4 and 4' may therefore be almost as large as the inner width of the space 1 of the cell, or the screens 4 and 4' may be omitted if air bubbles or particles which are lighter than the liquid in the measuring cell, cannot practically have a noticeable effect. The duct 8' may possibly open instead into the lower part of the cell as shown in FIG. 1 into the upper part thereof as indicated in FIG. 3.

Figure 3:
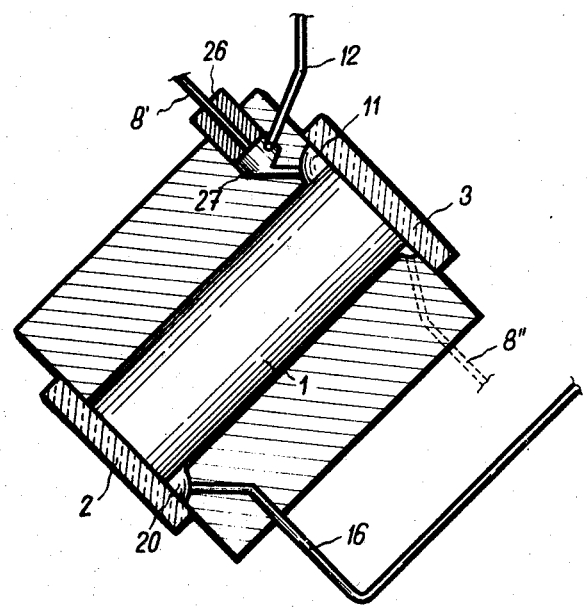

FIG. 3 shows a modified portion of the aggregate of FIG. 1 where the input tube 8' for the measured liquid opens into the uppermost place 11 of the inclined space of the bore 1 of the cell. The tube 8' extends through the plug 26 into the chamber 27 into which also opens the tube 12 leading to the source of constant pressure 15 possibly as indicated in FIG. 1 comprising an elastic part 22 serving to receive escaped gas when the tube 16 becomes closed by the valve 17, or when the exhaust pump 18 operates in accordance with FIG. 1. It is assumed that the bore 1 of the cell has such dimensions and such a surface that the liquid supplied by the tube 8' flows down on the walls of the bore 1 without clogging it forming a level which rises from the lowest place gradually until it reaches the uppermost place.

Any bubbles which entered with the liquid through the tube 8' may escape from chamber 27 directly into the tube 12. This tube 12 introduces in this case only rinsing gas which after the supply through the tube 8' has been cut off, flushes all spaces and escapes together with the seized remnants of the liquid into the tube 16. Before refilling, the tube 12 must be closed whereupon the filling can be repeated after the tube 8' has been opened. The exhaust tube 16 may in this case remain open and may even have a rising slope as indicated in FIG. 3.

However, the tube 8' may possibly open into another place in the upper part of the cell for example, as indicated by the dotted line in FIG. 5 showing a tube 8'', while the tube 12 may open into the highest place 11 in a similar manner as shown in FIG. 1. In this case filling may also be accomplished by running down the walls particularly the lower wall of the bore 1. During such filling the liquid begins to form in the lower part of the cell a level which advances in the upward direction until the liquid occupies the entire space of the bore 1 and advances partly at the highest place 11 of the cell into the mouth of the duct 12. It is assumed that in the filling phase the waste tube 16 is closed, for example by action of the valve 17 or by action of the exhaust pump 18 in accordance with FIG. 1.

The invention is particularly convenient where a high extinction is required for the purpose of achieving high sensitivity of the photometric method even if only a very small amount of liquid flows through the cell with steep gradients of the concentrations of the various components. This problem occurs particularly in modern analyzers of amino acids.

If the aggregate in accordance with the invention is to be used for other than photometric purposes, it can be adjusted to serve these purposes by properly adapting the cell. If for example, electric conductivity of liquids is to be measured, the accessories for photometric measurements are replaced by electrodes at both ends of the cell, these electrodes being included in an electric measuring circuit.

What is claimed is:

1. Flowcell apparatus for use in a photometric analysis system, said apparatus comprising a flowcell having an inclined elongated passageway for the measuring light beams and for the fluid to be measured and having light permeable bottom and top closure members at each end, an entrance duct into the passageway for fluid to be measured, an exit duct originating at the lowest point of the passageway for discharging the fluid from the passageway after measurement, an outlet duct originating at the highest point of the passageway to separate gaseous portions from liquid portions of said fluid, said entrance duct and said outlet duct being on the diametrically opposite side of said passageway from said exit duct, said outlet duct communicating with a source of gas under pressure for balancing fluid pressure in said passageway and for effecting discharge of fluid through said exit duct, control means for conducting fluid into said passageway from said entrance duct and for discharging fluid from said passageway through said exit duct, and said flowcell including an exit chamber extending outwardly from the passageway at its lowest point and serving as an inlet for the exit duct.

2. Flowcell apparatus according to claim 1 wherein said flowcell has an elongated groove extending downwardly from the outlet duct along the highest generatrix of the passageway toward the bottom closure member and receiving the entrance duct at its lowest point to conduct gaseous portions of the fluid to be measured separated from its liquid portions.

3. Flowcell apparatus according to claim 1, wherein said flowcell includes an inlet chamber adjacent the passageway, said inlet chamber being in fluid communication with said entrance duct and said outlet duct and serving to separate the liquid and gaseous portions of the fluid to be measured.

References Cited

UNITED STATES PATENTS

| | | | |
|---|---|---|---|
| 2,983,184 | 5/1961 | Ferrari | 356—246 |
| 3,080,789 | 3/1963 | Rosin et al. | 356—246 |
| 3,225,645 | 12/1965 | Baruch et al. | 356—246 |
| 3,246,559 | 4/1966 | Clifford | 356—246 |
| 3,263,554 | 8/1966 | Pickels | 356—246 |
| 3,280,857 | 10/1966 | DeGrave et al | 356—246 X |
| 3,334,018 | 8/1967 | Smythe | 23—253 X |
| 2,604,209 | 7/1952 | Hall et al. | 210—539 X |
| 3,025,405 | 3/1962 | Dadas | 250—218 |
| 3,236,602 | 2/1966 | Isreeli. | |
| 3,260,371 | 7/1966 | Wall | 210—539 X |
| 3,289,527 | 12/1966 | Gilford et al. | |
| 3,333,107 | 7/1967 | Hubbard et al. | |
| 3,345,910 | 10/1967 | Rosin et al. | |

JEWELL H. PEDERSEN, Primary Examiner

W. A. SKLAR, Assistant Examiner

U.S. Cl. X.R.

250—218